No. 829,067. PATENTED AUG. 21, 1906.
W. FERRIS.
BEET BLOCKER AND COTTON CHOPPER.
APPLICATION FILED MAY 10, 1906.
2 SHEETS—SHEET 1.
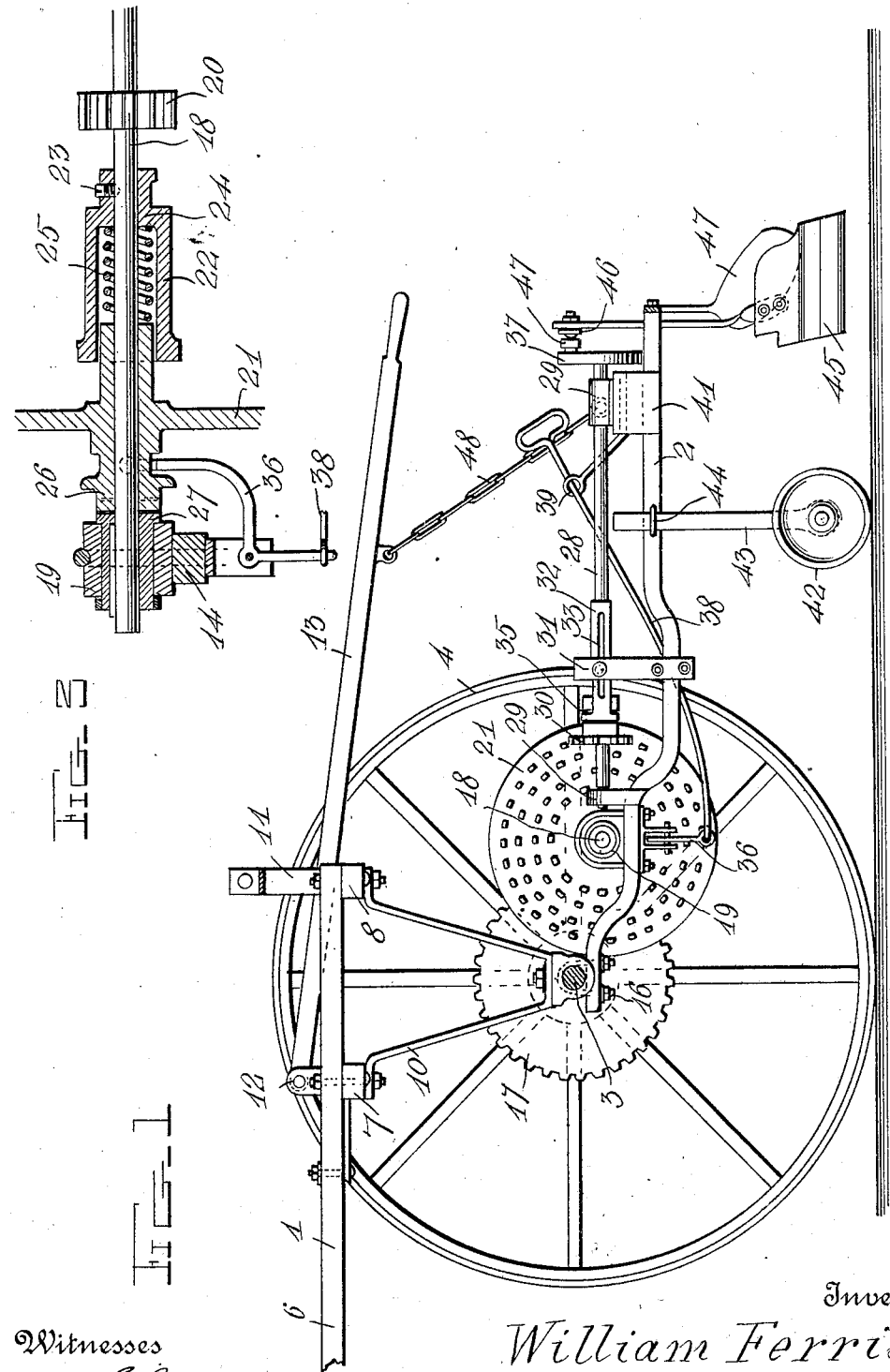
Witnesses
C. W. Griestauer
Inventor
William Ferris
by H. B. Willson & Co.
Attorneys

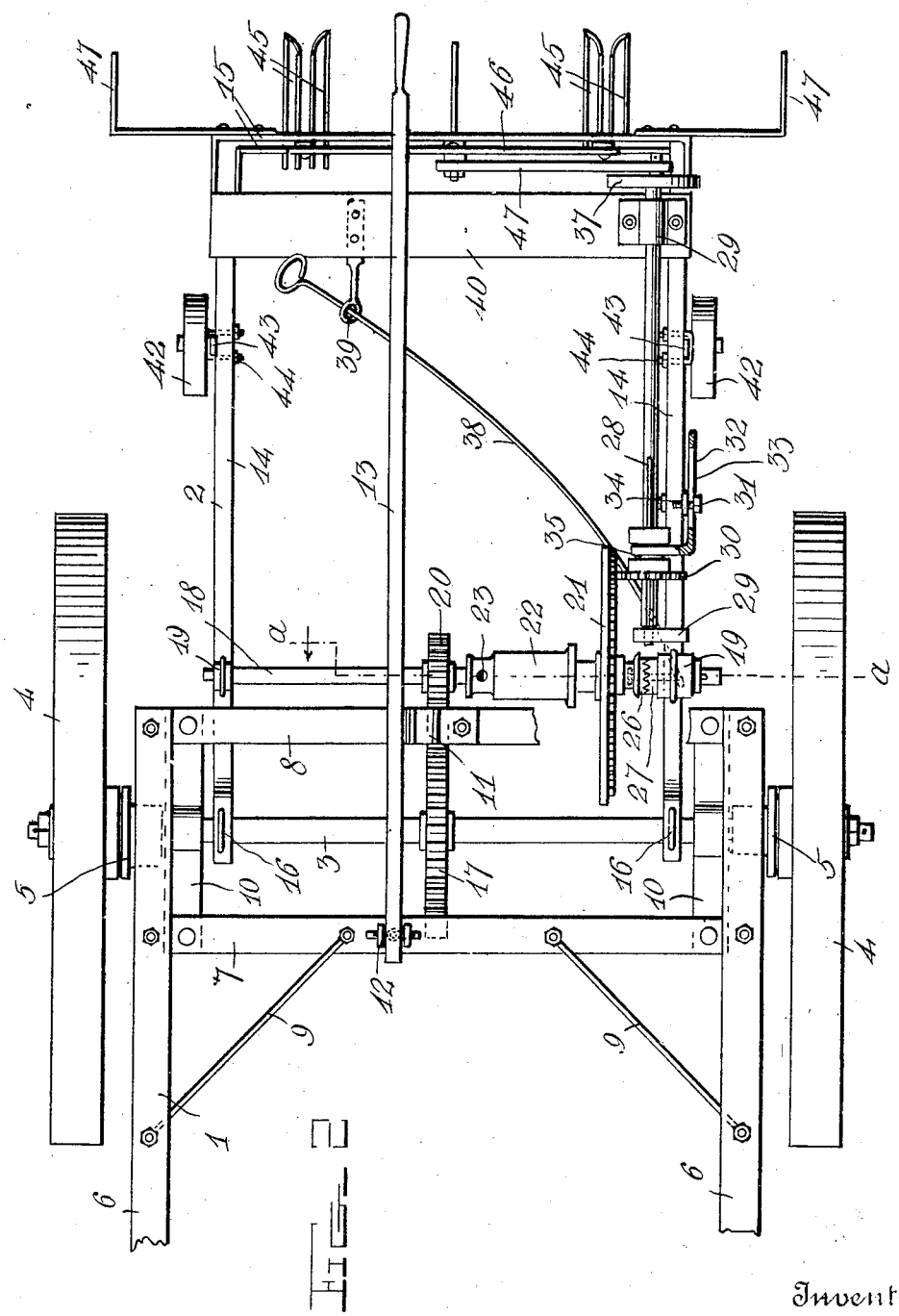

UNITED STATES PATENT OFFICE.

WILLIAM FERRIS, OF KINDE, MICHIGAN.

BEET-BLOCKER AND COTTON-CHOPPER.

No. 829,067.　　　Specification of Letters Patent.　　　Patented Aug. 21, 1906.

Application filed May 10, 1906. Serial No. 316,172.

*To all whom it may concern:*

Be it known that I, WILLIAM FERRIS, a citizen of the United States, residing at Kinde, in the county of Huron and State of Michigan, have invented certain new and useful Improvements in Beet-Blockers and Cotton-Choppers; and I do declare the following to be a full, clear, and exact description of the invention, such as will enable others skilled in the art to which it appertains to make and use the same.

My invention is an improved beet-blocker and cotton-chopper, which may also be used for thinning onions and performing similar work; and it consists in the construction, combination, and arrangement of devices hereinafter described and claimed.

In the accompanying drawings, Figure 1 is a side elevation of my improved beet-blocker and cotton-chopper with the near supporting-wheel removed and the axle shown in cross-section. Fig. 2 is a top plan view, parts of the truck being removed to disclose subjacent mechanism; and Fig. 3 is a detail sectional view taken on the plane indicated by the line *a a* of Fig. 2.

In the embodiment of my invention, I provide a truck 1 and a trailing frame 2. I will first describe the former. The axle-shaft 3 is provided with ground or traction wheels 4, loose thereon and connected thereto by the usual pawl-and-ratchet mechanisms, (indicated at 5.) The thills 6 have their rear ends connected by a pair of cross-bars 7 8, here shown as bolted thereto. Braces 9 are also here shown connecting the thills with the front cross-bar 8. To the under sides of said cross-bars are bolted depending brackets or standards 10, provided with bearings in which the axle-shaft 3 is journaled. On the upper side of the rear cross-bar 7 is secured a supporting-standard 11. A yoke 12 is pivotally connected to the front cross-bar 8 and supported on the upper side thereof, and to the said yoke is pivoted the front end of a lifting-bar 13.

The trailing frame 2 has side bars 14 and a pair of cross-bars 15, which connect the rear ends of said side bars. The front ends of the said cross-bars are pivotally connected, as at 16, to the axle-shaft 3. Said axle-shaft has a spur gear-wheel 17 keyed thereto at or near its center. A counter-shaft 18 is journaled in bearings 19 on the side bars 14 and is provided with a pinion 20, which engages said gear 17. Hence the counter-shaft is driven from the axle-shaft when the machine is in motion. A variable-speed-gear disk 21 is loose on the counter-shaft and is also free to move longitudinally thereon. A sleeve 22 is secured to the counter-shaft by a set-screw 23 or other suitable device and is provided in one end with a socket 24, which receives one end of a coil-spring 25. Said coil-spring extends around the counter-shaft and its opposite end bears against the hub of the gear-disk 21. Said gear-disk has a clutch member 26 movable therewith. A clutch member 27 is secured by a key or other suitable device to the counter-shaft. The function of the spring 25 is to normally engage the clutch member 26 with the clutch member 27 to lock the gear-disk to the counter-shaft.

A longitudinal shaft 28 is mounted in bearings 29 above one side of the trailing frame 2.

At the front end of the said longitudinal shaft is a pinion 30, which is splined thereon, so that it may be moved longitudinally and shifted across the rear face of the gear-disk 21 and engaged with said gear-disk at any point, according to the required speed to be imparted to the shaft 28. A standard 31 is secured to and projects upwardly from one of the side bars 14. An angle-bar 32 has its longitudinal arm provided with a longitudinal slot 33. A set-screw 34 secures said angle-bar to the standard 31 and passes through said slot 33, the latter and said set-screw enabling said angle-bar to be longitudinally adjusted. The transverse arm of said angle-bar engages an annular groove 35 in the hub of the shiftable gear-pinion 30, and hence said pinion may be shifted on the variable-speed gear-disk 21 by means of said angle-bar and set-screw at any desired adjustment with reference to said gear-disk. A lever 36 is provided which engages an annular groove in the clutch member 26 and enables said clutch member, and hence the gear-disk, to be moved. When such clutch member 26 is moved into engagement with the clutch member 27, so that the disk 21 will be driven by the counter-shaft, said disk is also moved into engagement with the pinion 30, so that the longitudinal shaft will be driven from said counter-shaft. At the rear end of the longitudinal shaft is a crank-wheel 37. A link-rod 38 is here shown connected to the lever 36 to operate the latter. Said link-rod passes through a guide-eye 39 on a cross-bar 40, which cross-bar is supported near the rear ends of and above the side bar 14 of the trailing frame by plates 41.

Ground-wheels 42, which support the rear portion of the trailing frame, have their standards 43 secured to the sides of the trailing frame for vertical adjustment, so that the rear end of the trailing frame may be supported at any required distance above the surface of the ground. Any suitable means may be employed to thus adjustably secure said standards 43 to the trailing frame. I show U-bolts 44 for this purpose. Between the rear cross-bars 15 of said frame 2 are fulcrumed blocking, chopping, or thinning hoes 45, which are adapted to be swung transversely across the rows of growing plants to block or chop out the superfluous plants. The upper ends of the said hoes are connected together by a rod 46, which is pivotally connected thereto. A pitman 47 connects said bar 46 to the crank of the crank-wheel 37, and hence the blocking, chopping, and thinning hoes are operated, as will be understood. By varying the speed of the movement of the blocking, chopping, and thinning hoes by shifting the pinion 30 on the speed-gear disk 21 the space between the plants left standing in the rows may be regulated. The depth at which said hoes operate is regulated by adjusting the frame 2 with reference to the standard 43. To prevent the hoes from throwing the earth on the growing plants of adjacent rows, I provide shields 47, which are carried by the frame 2 and which may be either of the form here shown or of any other suitable form.

Since the front end of the trailing frame is pivotally connected to the axle-shaft of the truck, it will be understood that said trailing frame may be raised when the machine is not in operation to facilitate the movement of the machine from place to place. I connect said trailing frame to the lifting-bar by a chain or other suitable device 48. Said lifting-bar may be operated by the driver, who walks behind the machine, and when the trailing frame has been raised said lifting-bar is engaged with the standard 11, which serves to support the standard 11, and hence said trailing frame, in elevated position.

From the foregoing description, taken in connection with the accompanying drawings, the construction and operation of the invention may be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. In a machine of the class described, the combination of a frame, a driven shaft mounted thereon, a clutch element fast on said shaft, a variable-speed gear loose and shiftable longitudinally on said shaft and having a clutch element to engage and disengage the first-mentioned clutch element, means to shift said variable-speed gear, a chopping element, a shaft to operate the same, and a pinion on said shaft shiftable radially with reference to the speed-gear.

2. In a machine of the class described, the combination of a frame, a driven shaft mounted thereon, a clutch element fast on said shaft, a variable-speed gear loose and shiftable longitudinally on said shaft and having a clutch element to engage and disengage the first-mentioned clutch element, a chopping element, a shaft to operate the same, a pinion on said shaft shiftable radially with reference to the speed-gear, a spring to move the said speed-gear into engagement with the said pinion and the clutch element of the said speed-gear into engagement with the fast clutch element, and a lever to move said speed-gear in the reverse direction.

3. In a machine of the class described, the combination of a truck having an axle-shaft provided with a master-gear, a trailing frame connected to said truck for vertical angular movement, a chopping element carried by said trailing frame, a counter-shaft in said trailing frame having a gear engaging the master-gear, a clutch element fast to said counter-shaft, a variable-speed gear loose and longitudinally movable on the counter-shaft and having a clutch element to engage and disengage the fast clutch element, a longitudinal shaft on the trailing frame, a chopping element operated by said longitudinal shaft, a pinion on said longitudinal shaft shiftable radially with respect to the variable-speed gear, means to shift the variable-speed gear into and out of engagement with the shiftable pinion and its clutch element into and out of engagement with the fast clutch element, and means to raise and lower the said angularly-movable frame.

In testimony whereof I have hereunto set my hand in presence of two subscribing witnesses.

WILLIAM FERRIS.

Witnesses:
O. E. WOODHULL,
W. H. HACKING.